(12) United States Patent
Horng et al.

(10) Patent No.: US 6,727,626 B2
(45) Date of Patent: Apr. 27, 2004

(54) BALANCING PLATE FOR A MOTOR

(75) Inventors: Alex Horng, Kaohsiung (TW);
Ching-Sheng Hong, Kaohsiung (TW);
Chia-Wen Kang, Kaohsiung (TW)

(73) Assignee: Sunonwealth Electric Machine Industry Co., Ltd. (TW)

( * ) Notice: Subject to any disclaimer, the term of this patent is extended or adjusted under 35 U.S.C. 154(b) by 0 days.

(21) Appl. No.: 10/123,283

(22) Filed: Apr. 17, 2002

(65) Prior Publication Data

US 2003/0197435 A1 Oct. 23, 2003

(51) Int. Cl.⁷ .................................. H02K 7/04
(52) U.S. Cl. ................ 310/190; 310/67 R; 310/51
(58) Field of Search ................ 310/90.5, 51, 68 B, 310/168, 190, 191, 67 R, 89

(56) References Cited

U.S. PATENT DOCUMENTS

| | | | | |
|---|---|---|---|---|
| 4,728,833 A | * | 3/1988 | Shiraki et al. | 310/68 R |
| 5,355,373 A | * | 10/1994 | Salmon et al. | 310/71 |
| 5,679,997 A | * | 10/1997 | Matsuzawa et al. | 310/254 |
| 5,808,390 A | * | 9/1998 | Miyazawa et al. | 310/194 |
| 6,291,916 B1 | * | 9/2001 | Huang et al. | 310/90.5 |
| 6,400,053 B1 | * | 6/2002 | Horng | 310/91 |

FOREIGN PATENT DOCUMENTS

| JP | 2-214455 | * | 8/1990 | H02K/21/22 |
|---|---|---|---|---|
| JP | 2001-86720 | * | 3/2001 | H02K/21/22 |
| JP | 2001-258185 | * | 9/2001 | H02K/21/22 |

* cited by examiner

Primary Examiner—Burton Mullins
(74) Attorney, Agent, or Firm—Bacon & Thomas, PLLC

(57) ABSTRACT

A balancing plate comprises an axial hole for engagement with a stator and at least two induction edges symmetrically arranged with respect to the axial hole. Each induction edge includes an arc length that is not greater than a length of one of plural poles of an annular permanent magnet of a rotor. When the motor rests, the induction edges of the balancing plate face at least two of the poles of the annular permanent magnet having the same polarity, forming a mating therebetween to thereby allow easy restarting of the motor.

3 Claims, 4 Drawing Sheets

BALANCING PLATE FOR A MOTOR

BACKGROUND OF THE INVENTION

1. Field of the Invention

The present invention relates to a balancing plate for a motor. In particular, the present invention relates to a balancing plate having at least two induction edges, each induction edge having an arc length that mates with a length of one of plural poles of the annular permanent magnet on a rotor, thereby allowing stable rotation of the motor and allowing easy restarting of the motor by means of preventing the rotor from being locked by excessive magnetic attractive force between the respective induction edge and the permanent magnet.

2. Description of the Related Art

FIG. 1 of the drawings illustrates a motor and a conventional balancing plate therefore. FIG. 2 is a plan view of the motor and the balancing plate after assembly. As illustrated in FIGS. 1 and 2, the conventional motor 1 comprises a rotor 10, a stator 2, a balancing plate 30, and a circuit board 40 that are assembled along an axial direction to thereby form the motor. The balancing plate 30 includes an axial hole 31 and a plurality of induction edges 32 each having a predetermined arc length a. The induction edges 32 are preferably sector-like and diametrically, symmetrically arranged. The rotor 10 has a permanent magnet 11 that is radially spaced from the silicon steel plates 21 of the stator 20. The rotor 10 is driven by alternating magnetic fields generated by the silicon steel plates 21. The balancing plate 30 is located on the permanent magnet side of the rotor 10 such that the balancing plate 30 and the permanent magnet 11 of the rotor 10 always have an induction force therebetween regardless of the fact that the motor 1 is turning or stopped, thereby providing an appropriate inductive magnetic force to the rotor 10. In fact, the inductive magnetic force provided by the induction edges 32 of the balancing plate 30 is a downward, attractive balancing force, which is also a damping force in a way. Namely, the damping force will reduce the rotational efficiency. When the arc length a of the respective induction edge 32 of the balancing plate 30 is too long; namely, the arc length a of the respective induction edge 32 of the balancing plate 30 is greater than the length of the respective pole of the annular permanent magnet 11 of the rotor 10, an excessive inductive magnetic force is generated between the balancing plate 30 and the rotor 10, resulting a decrease in the rotational efficiency of the motor. Further, when the motor 1 is stopped, restarting of the motor 1 would not be easy in view of the excessive inductive magnetic force generated between the balancing plate 30 and the rotor 10. If the arc length a of the respective induction edge 32 of the balancing plate 30 is too short, the balancing force is insufficient for the rotor 10 such that the rotor 10 would "wobble" and "float" during rotation. Therefore, the arc length a of the respective induction edge 32 of the balancing plate 30 needs to be redesigned so as to provide the rotor 10 with sufficient balancing force and to allow easy restarting of the motor 1.

SUMMARY OF THE INVENTION

It is the primary object of the present invention to provide a balancing plate having at least two induction edges, each induction edge having an arc length that is equal to or less than a length of one of plural poles of the annular permanent magnet on a rotor. Thus, the arc length of the respective induction edge mates with the length of the respective pole of the annular permanent magnet, thereby avoiding generation of excessive inductive magnetic force and allowing easy restarting of the motor.

It is the secondary object of the present invention to provide a balancing plate having at least two induction edges, each induction edge having an arc length that is equal to or less than a length of one of plural poles of the annular permanent magnet on a rotor. Thus, the arc length of the respective induction edge mates with the length of the respective pole of the annular permanent magnet, thereby providing sufficient inductive magnetic force and allowing stable rotation of the motor.

A balancing plate in accordance with the present invention is to be assembled with a rotor, a stator, and a circuit board to form a motor. The balancing plate comprises an axial hole for engagement with a stator and at least two induction edges symmetrically arranged with respect to the axial hole. Each induction edge includes an arc length that is not greater than a length of one of plural poles of an annular permanent magnet of a rotor. When the motor rests, the induction edges of the balancing plate face at least two of the poles of the annular permanent magnet having the same polarity, forming a mating therebetween to thereby allow easy restarting of the motor.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

A preferred embodiment in accordance with the present invention will now be described with reference to the accompanying drawings.

Figure 1:
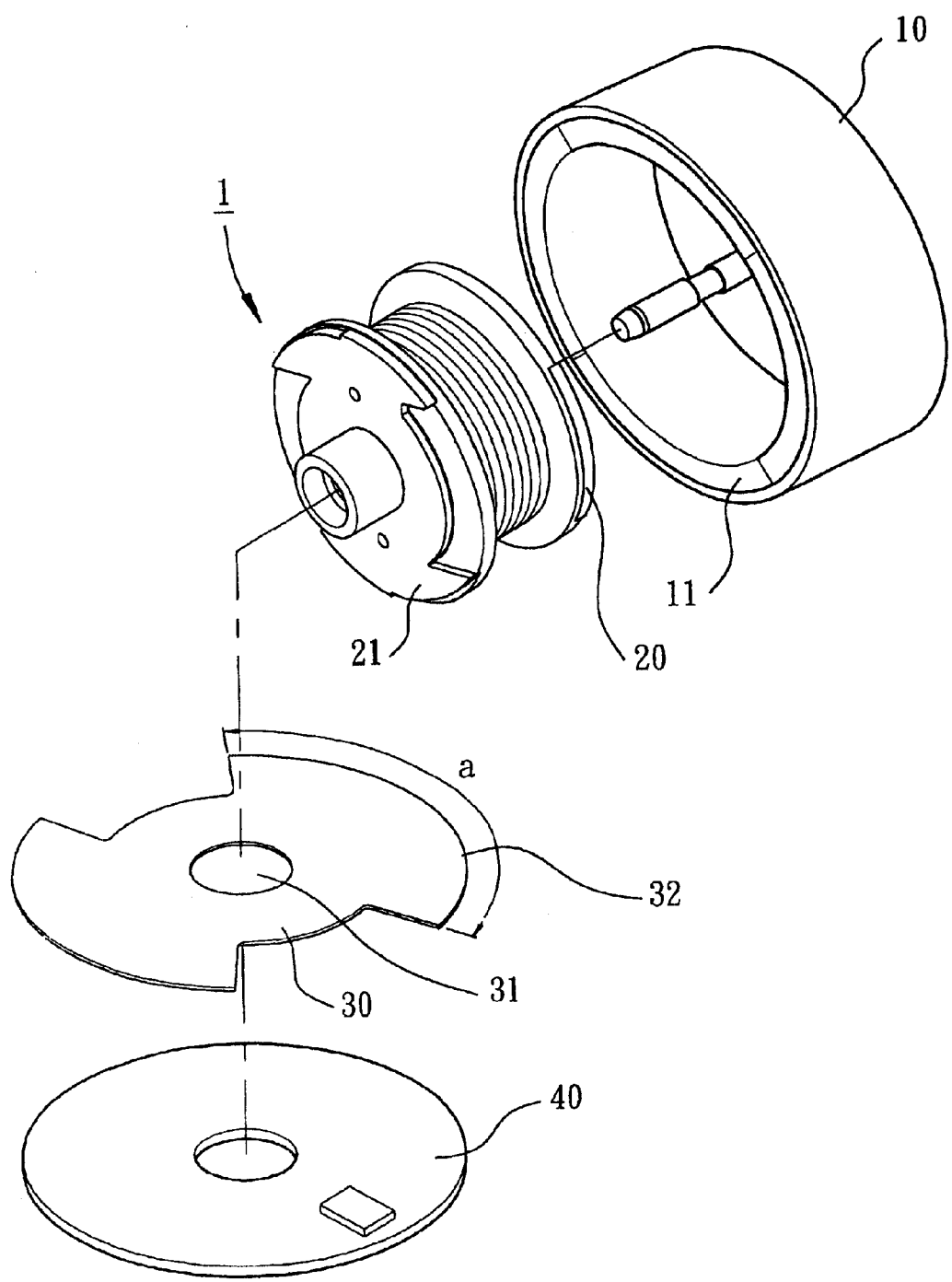
FIG. 1 is an exploded perspective view of a conventional motor with a conventional balancing plate.
Figure 2:
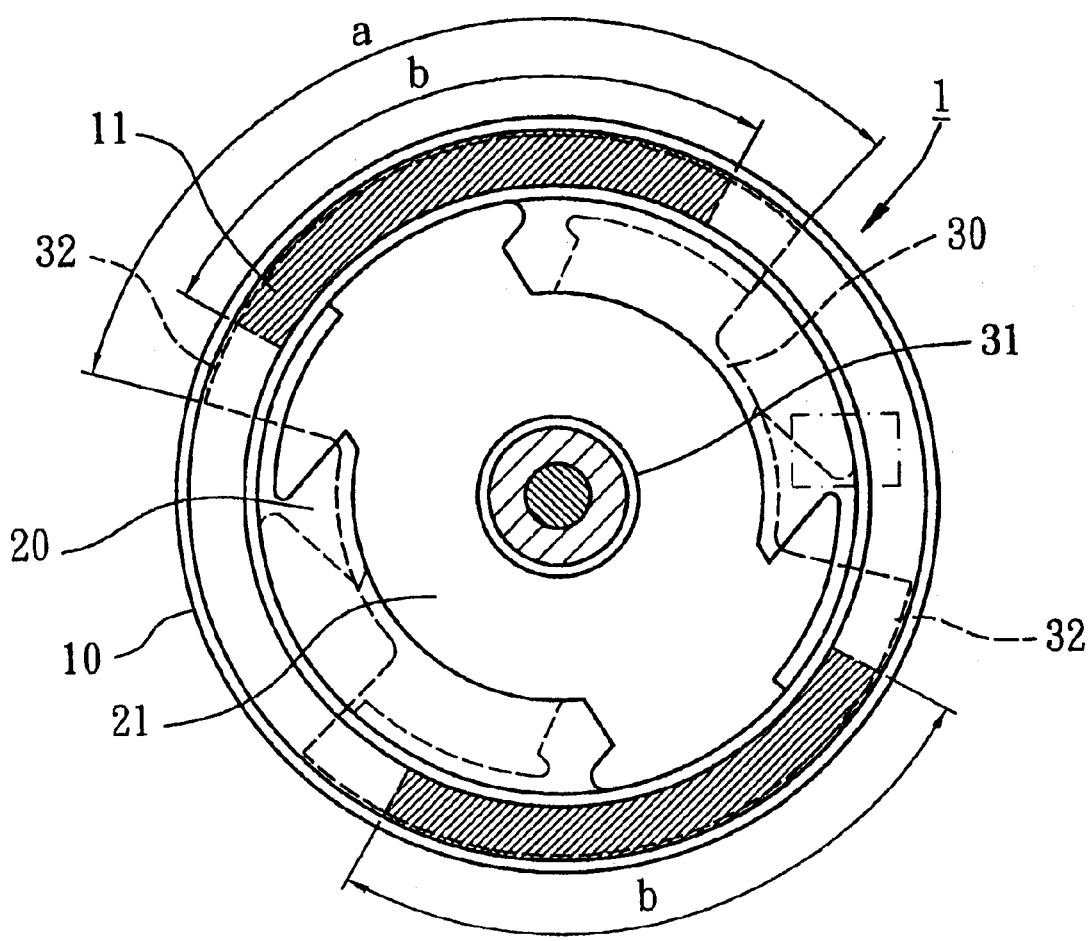
FIG. 2 is a plan view of the motor and the conventional balancing plate after assembly.
Figure 3:
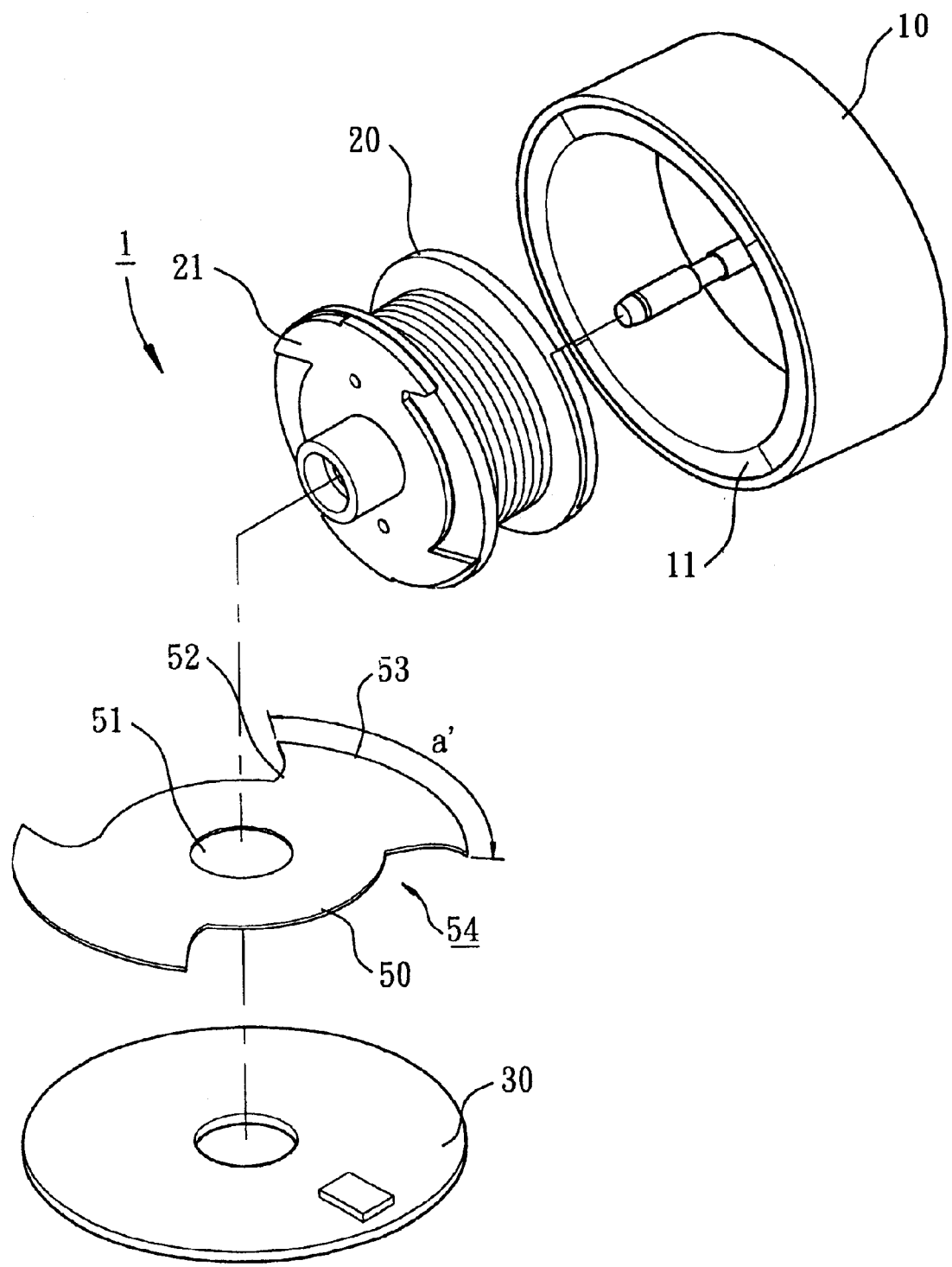
FIG. 3 is an exploded perspective view of a motor with a balancing plate in accordance with the present invention.
Figure 4:
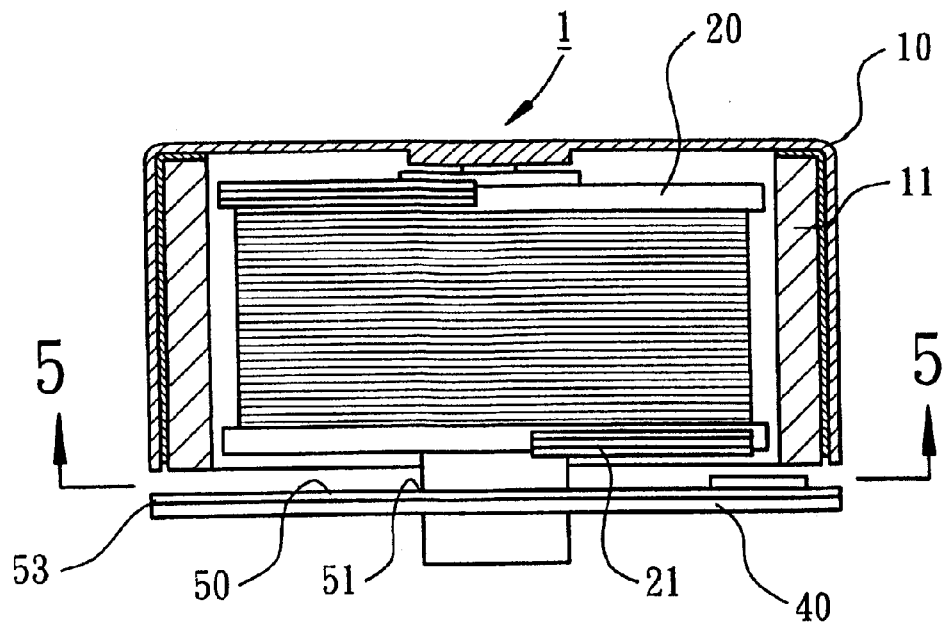
FIG. 4 is a sectional view of the motor in FIG. 3.
Figure 5:
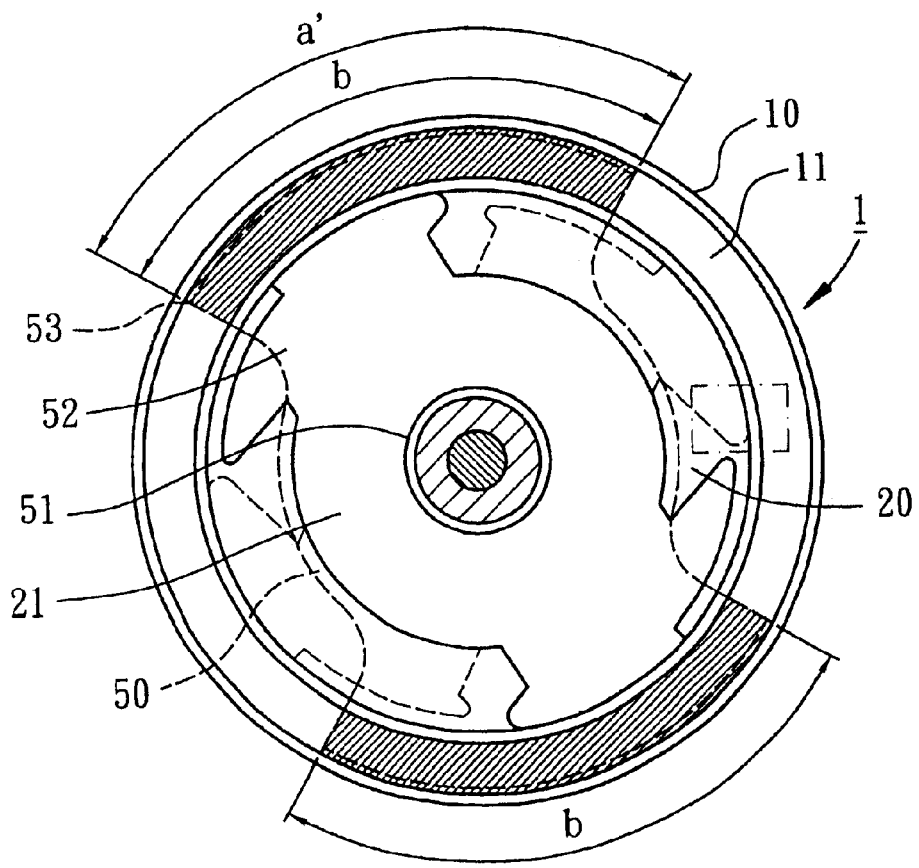
FIG. 5 is a sectional view taken along plane 5-5 in FIG. 4.

FIG. 3 is an exploded perspective view of a motor with a balancing plate in accordance with the present invention. FIG. 4 is a sectional view of the motor in FIG. 3. FIG. 5 is a sectional view taken along plane 5-5 in FIG. 4. The numerals in FIGS. 3 through 5 identical to those in FIGS. 1 and 2 denote identical elements in FIGS. 1 and 2, and detailed description of these elements is not given to avoid redundancy.

Referring to FIG. 3, a balancing plate 50 in accordance with the present invention is generally assembled with a rotor 10, a stator 20, and a circuit board 40 along an axial direction to form a motor 1. The balancing plate 50 is made of magnetically conductive material and comprises an axial hole 51, a plurality of necks 52, two induction edges 53, and two grooves 54. The axial hole 51, the necks 52, the induction edges 53, and grooves 54 are located on a common plane. In particular, the induction edges 53 are located on a common plane such that the induction edges 53 have an identical distance to the annular permanent magnet 11 of the rotor 10. Thus, the force between the respective induction edge 53 and the annular permanent magnet 11 is the same. Each neck 52 extends from the axial hole 51 along a radial direction to the respective induction edge 53, leaving two grooves 54 for separating the induction edges 53. The induction edges 53 have identical arc length a' that is preferably equal to a length b of one of plural poles of the annular permanent magnet 11 of the rotor 10, as illustrated in FIG. 5. Alternatively, the arc length a' of the respective induction edge 53 is slightly smaller than length b of the respective pole of the annular permanent magnet 11.

Referring to FIGS. 4 and 5, after assembly of the rotor 10 and the stator 20 and before starting of the rotor 10, the balancing plate 50 is located on the permanent magnet side of the rotor 10 with the arc length a' of the respective induction edge 53 of the balancing plate 50 facing two poles of the permanent magnet 11 having the same polarity (north poles or south poles). Since the arc length a' of the respective induction edge 53 of the balancing plate 50 is equal to or less than (namely, not greater than) the length b of the respective pole of the permanent magnet 11, the rotor 10 can be easily restarted, as excessive attractive force is avoided. As can be seen from FIG. 5, when the rotor 10 turns, the respective induction edge 53 of the balancing plate 50 attracts the rotor 10 to thereby balance the rotating rotor 10, reducing the "wobbling" or "floating" phenomenon of the rotational rotor 10.

Compare FIG. 2 with FIG. 5. Since the arc length a of the respective induction edge 53 of the balancing plate 50 is too long and thus does not mate with the length b of the respective pole of the permanent magnet 11, an excessive inductive magnetic force (attraction force) is generated between the balancing plate 30 and the rotor 10, resulting in a decrease in the rotational efficiency of the motor. Further, the excessive inductive magnetic force causes difficult restarting of the motor, as the rotor 10 would be locked by the excessive inductive magnetic force. By contrast, since the arc length a' of the respective induction edge 53 of the balancing plate 50 in accordance with the present invention is not greater than and thus mates with the length b of the respective pole of the permanent magnet 11, reduction in the rotational efficiency of the rotor 10 is avoided and easy restarting of the rotor 10 is allowed, as the inductive magnetic force between the balancing plate 50 and the rotor 10 is appropriate without causing locking of the rotor 10.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A balancing plate for a motor, the balancing plate being adapted to be assembled with a rotor, a stator, and a circuit board to form the motor, the balancing plate comprising:

an axial hole for engagement with a stator; and at least two induction edges symmetrically arranged with respect to the axial hole, each of said at least two induction edges including an arc length that is not greater than a length of one of plural poles of an annular permanent magnet of a rotor;

wherein when the motor rests, said at least two induction edges of the balancing plate face at least two of said plural poles of the annular permanent magnet having the same polarity, forming a mating therebetween to thereby allow easy restarting of the motor.

2. The balancing plate as claimed in claim 1, wherein the balancing plate includes at least two necks, each of said at least two necks extending from the axial hole to an associated one of said at least two induction edges.

3. The balancing plate as claimed in claim 2, wherein two of said at least two necks have a groove therebetween, thereby separating said at least two induction edges.

* * * * *